(12) United States Patent
Eckert et al.

(10) Patent No.: US 8,698,345 B2
(45) Date of Patent: Apr. 15, 2014

(54) ELECTRICAL DRIVE SYSTEM

(75) Inventors: Peter Eckert, Erlangen (DE); Günter Kristen, Forchheim (DE); Michael Meinert, Erlangen (DE); Karsten Rechenberg, Dormitz (DE)

(73) Assignee: Siemens Aktiengesellschaft, Munich (DE)

( * ) Notice: Subject to any disclaimer, the term of this patent is extended or adjusted under 35 U.S.C. 154(b) by 784 days.

(21) Appl. No.: 12/679,939

(22) PCT Filed: Sep. 2, 2008

(86) PCT No.: PCT/EP2008/061545
§ 371 (c)(1),
(2), (4) Date: Mar. 25, 2010

(87) PCT Pub. No.: WO2009/043666
PCT Pub. Date: Apr. 9, 2009

(65) Prior Publication Data
US 2010/0253146 A1    Oct. 7, 2010

(30) Foreign Application Priority Data
Sep. 27, 2007    (DE) .......................... 10 2007 046 275

(51) Int. Cl.
*B60L 1/00*    (2006.01)
(52) U.S. Cl.
USPC ........................................................ 307/9.1
(58) Field of Classification Search
USPC ....... 307/9.1, 10.7; 340/455; 191/2; 320/103, 320/104
See application file for complete search history.

(56) References Cited

U.S. PATENT DOCUMENTS

| | | | |
|---|---|---|---|
| 5,599,076 A | 2/1997 | Burckhardt | |
| 6,549,842 B1 | 4/2003 | Hac | |
| 7,969,121 B2* | 6/2011 | Smith et al. | 320/167 |
| 2004/0024514 A1 | 2/2004 | Levy | |
| 2004/0140139 A1 | 7/2004 | Malik | |
| 2005/0234628 A1 | 10/2005 | Luders | |
| 2005/0253243 A1 | 11/2005 | King | |
| 2006/0125319 A1* | 6/2006 | King et al. | 307/10.1 |

FOREIGN PATENT DOCUMENTS

| | | |
|---|---|---|
| DE | 19903427 A1 | 8/2000 |
| DE | 10346796 A1 | 5/2005 |
| DE | 102005061830 B3 | 6/2007 |
| DE | 102006010713 A1 | 9/2007 |

(Continued)

OTHER PUBLICATIONS

Bonert R et al: "Super-Capacitors for Peak Load Shaving of Batteries" EPE '97. 7th. European Conference on Power Electronics and Applications. Trondheim, Sep. 8-10, 1997; Brussels, EPE Association, B. Bd. 1, Sep. 8, 1997, Seiten 1055-1060; XP000769079; Others.

(Continued)

*Primary Examiner* — Daniel Cavallari
(74) *Attorney, Agent, or Firm* — Harness, Dickey & Pierce, P.L.C.

(57) ABSTRACT

An electric drive system, in particular for a rail vehicle, includes an electric energy accumulator and an electrochemical energy accumulator, connected in parallel. According to at least one embodiment of the invention, a component, e.g., a diode with a transmission direction facing away from the electrochemical energy accumulator, is situated in a connecting line between the electric energy accumulator and the electrochemical energy accumulator.

6 Claims, 2 Drawing Sheets

(56) References Cited

FOREIGN PATENT DOCUMENTS

| | | |
|---|---|---|
| DE | 10 2007 032 776 | 1/2009 |
| EP | 1372049 | 12/2003 |
| EP | 1424494 A1 | 6/2004 |
| EP | 1719676 | 11/2006 |
| WO | WO 03074387 | 9/2003 |

OTHER PUBLICATIONS

Chinese Office Action dated Jun. 6, 2012 issued in corresponding Chinese Application No. 2008801089369 and English translation thereof.

* cited by examiner

ELECTRICAL DRIVE SYSTEM

PRIORITY STATEMENT

This application is the national phase under 35, U.S.C. §371, of PCT International Application No. PCT/EP2008/061545 which has an International filing date of Sep. 2, 2008, which designates the United States of America, and which claims priority on German patent application number DE 10 2007 046 275.3 filed Sep. 27, 2007, the entire contents of each of which are hereby incorporated herein by reference.

FIELD

At least one embodiment of the invention generally relates to an electrical drive system, in particular for a rail vehicle, having an electrical energy store and an electrochemical energy store, which are connected in parallel.

BACKGROUND

One electrical drive system is described in German patent application 10 2007 032 776.7. In this case, good energy storage is ensured by the use of two different types of energy store. This is particularly applicable for use in a rail vehicle which is intended to manage, at least over a limited distance, without electrical energy being supplied via an overhead line or a live rail.

By way of example, one suitable electrical energy store is a capacitor, in particular a so-called double-layer capacitor. By way of example, a suitable electrochemical energy store is a commercially available battery, in which a chemical reaction takes place. One example of this is a nickel-cadmium battery.

In the case of what is known, an energy management unit is provided which controls the energy exchange between a drive unit and the energy stores. Both the energy stores that are provided, the electrical and the electrochemical energy stores, are in this case used in the same manner.

SUMMARY

At least one embodiment of the invention involves optimally utilizing both available energy stores, while taking account of their different charging and discharge characteristics, with minimal circuit complexity.

According to at least one embodiment of the invention, a component with a forward direction away from the electrochemical energy store is arranged in a connecting line between the electrical energy store and the electrochemical energy store.

By way of example, the component is a mechanical switch, an electronic switch or a diode.

By way of example, the electrical energy store is a double-layer capacitor, and the electrochemical energy store is, for example, a battery.

The component which, for example, is a diode, advantageously and in a simple manner prevents charge from flowing out of the electrical energy store to the electrochemical energy store, which is in general charged to a lower level. It is therefore possible to first of all utilize only the energy from the electrical energy store when energy is being output from the energy stores, until the electrical energy store has been discharged to such an extent that its charge corresponds to the charge in the electrochemical energy store.

This results in the advantage that the electrical energy store initially covers the demand with a high maximum power for short time periods. This is worthwhile since the electrical energy store can be discharged more quickly than the electrochemical energy store, which is a consequence of their different charging and discharge characteristics. The electrochemical energy store is used to output and to receive relatively large amounts of energy at a relatively low maximum power level, over a relatively long time. The energy which is required or has to be stored during starting and braking (high power over a short time period) is associated with the electrical energy store. The energy for a relatively long journey without any external supply (relatively low power over a relatively long time) is associated with the electrochemical energy store.

Therefore, since the electrochemical energy store is not used for short-term charging and discharging at high power levels and high current levels, its life is advantageously considerably lengthened.

Furthermore, this results in the advantage that, despite the different charging and discharge characteristics of the energy stores, only a low level of circuit hardware complexity is required.

In the case of the parallel circuit, decoupled via the component, the energy flow splitting is carried out automatically between the electrochemical energy store and the electrical energy store. When the voltage level of the electrical energy store is higher than the voltage level of the electrochemical energy store, most of the energy flow (storage and removal) takes place to and from the electrical energy store. When the voltage level of the electrical energy store is lower than the voltage level of the electrochemical energy store, most of the energy flow (storage and removal) takes place to and from the electrochemical energy store. This takes account of the fact that the voltage level of the electrical energy store, for example of a double-layer capacitor, in the charged state is higher than the voltage level of the electrochemical energy store, for example a battery, but then the voltage decreases more quickly when the electrical energy store is being discharged than in the case of the electrochemical energy store, as a result of which the voltage profiles cross as time passes.

By way of example, the maximum voltage across the electrochemical energy store is between 40% and 70% of the maximum voltage across the electrical energy store.

By way of example, the electrochemical energy store is connected to a charging device.

A separate charging device such as this is required in order to ensure that the diode, which is advantageous for discharging, does not impede the charging process.

By way of example, the energy stores are connected to a voltage intermediate circuit of a converter. In this case, it is necessary for the voltage levels of both energy stores to be matched to the intermediate-circuit voltage. This is achieved by the use of a step-up/step-down converter, or by a direct link.

In particular, the electrical drive system according to at least one embodiment of the invention achieves the advantage that, when the two energy stores that are provided have different charging and discharge characteristics, these energy stores can be used optimally, with the circuit hardware complexity nevertheless being low.

BRIEF DESCRIPTION OF THE DRAWINGS

Example embodiments of the electrical drive system according to the invention will be explained in more detail with reference to the drawings.

The same components have the same reference symbols in the drawings.

DETAILED DESCRIPTION OF THE EXAMPLE EMBODIMENTS

Figure 1:
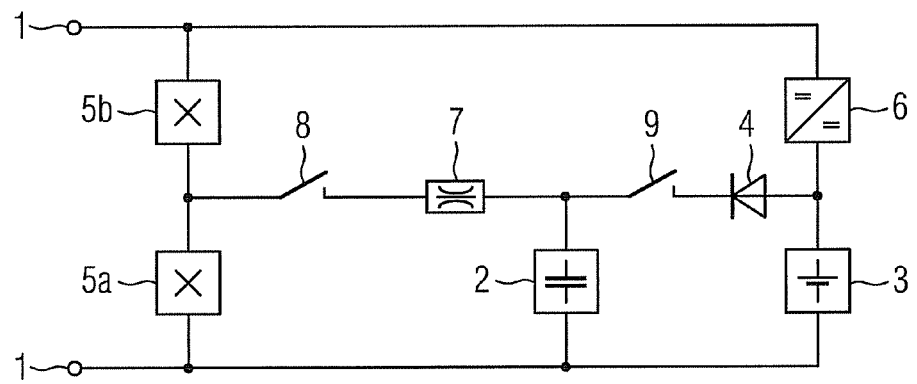
FIG. 1 shows an electrical energy store and an electrical chemical energy store, and a charging device, for connection to a voltage intermediate circuit of a converter.

As can be seen from FIG. 1, parallel-connected energy stores 2, 3 are connected to connections 1 for a voltage intermediate circuit. This relates to an electrical energy store 2 which, for example, is a double-layer capacitor, and an electrochemical energy store 3. The electrochemical energy store 3, for example, is a nickel-cadmium battery. A diode 4 with a forward direction away from the electrochemical energy store 3 is arranged in a connecting line between the electrical energy store 2 and the electrochemical energy store 3. The diode 4 deliberately prevents the electrochemical energy store 3 from being charged from the electrical energy store 2. This ensures that the discharging of the electrochemical energy store 3 does not start until the remaining charge in the electrical energy store 2 is less than the charge in the electrochemical energy store 3.

For deliberate charging of the electrochemical energy store 3, two components 5a, 5b which can be switched off are connected in series to the connections 1 for the voltage intermediate circuit, one of which components, the component 5a, is connected to the parallel-connected energy stores 2, 3, while the other component 5b is connected to a charging device 6. The charging device 6 is connected to the electrochemical energy store 3 and ensures that the latter is charged despite the diode 4 that is present. The components 5a, 5b which can be switched off and, for example, are semiconductors which can be switched off and have a freewheeling circuit, form, in conjunction with an inductor 7 in the line circuit of the energy stores 2, 3, a step-up/step-down converter, by means of which the voltage level of the energy stores, which may vary to a major extent depending on the state of charge, is matched to the voltage level of the voltage intermediate circuit.

A first switch 8 is provided in the line circuit of the two energy stores 2 and 3, which circuit starts from the component 5a, in order to disconnect the entire line circuit. A second switch 9 is used for deliberate disconnection of the connection between the electrical energy store 2 and the electrochemical energy store 3.

Figure 2:
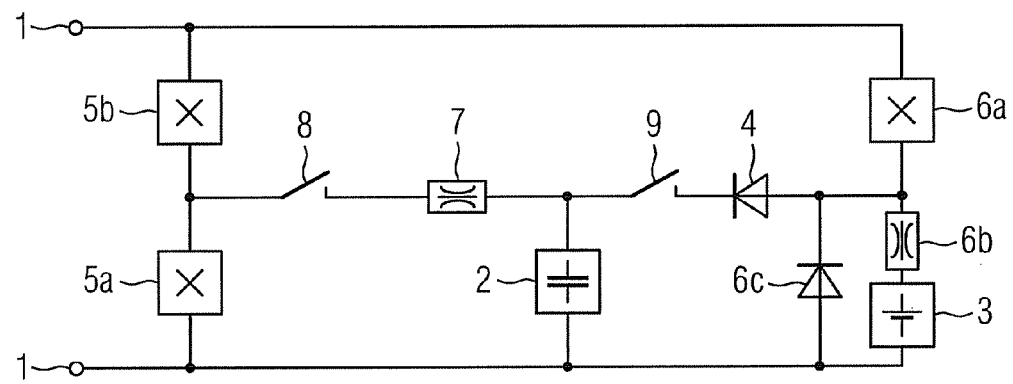
FIG. 2 shows one variant of the circuit shown in FIG. 1.

FIG. 2 shows a variant in which the charging device for the electrochemical energy store 3 comprises a component 6a which can be switched off and, for example, is a power semiconductor which can be switched off, together with a freewheeling diode, and also an inductor 6b and a diode 6c, which together form a step-down converter. This allows more uniform charging of the electrochemical energy store 3, bypassing the diode 4.

Figure 3:
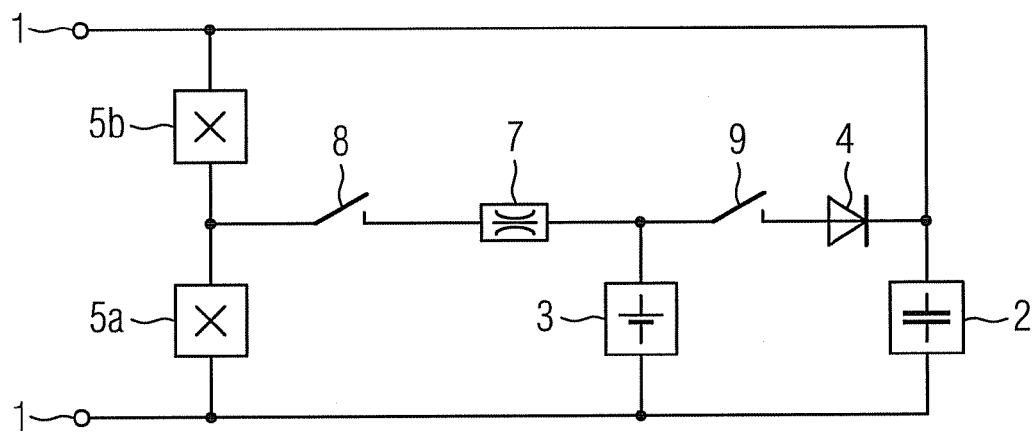
FIG. 3 shows one variant of the circuit shown in FIG. 1, in which there is no need for a charging device.

In a variant shown in FIG. 3, the electrical energy store 2 is connected directly to the two connections 1 for the voltage intermediate circuit. The electrochemical energy store 3, which is connected in parallel with the electrical energy store 2, is connected to the connections 1 for the voltage intermediate circuit via one of the components 5a which can be switched off. The diode 4 is arranged in the connecting line between the two energy stores 2 and 3, with its forward direction away from the electrochemical energy store 3. It therefore carries out the same function as in the other exemplary embodiments.

Figure 4:
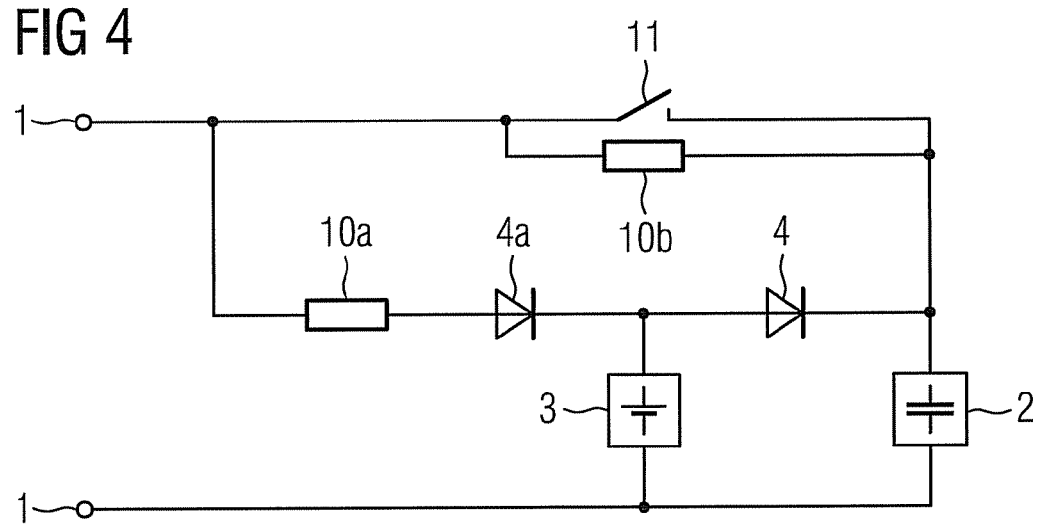
FIG. 4 shows one variant of the circuit shown in FIG. 3.

In a variant shown in FIG. 4, there is no need for any components which can be switched off since both the electrical energy store 2 and the electrochemical energy store 3 are connected via separate charging resistors 10a, 10b to the same connection 1 for the voltage intermediate circuit. In this case, a second diode 4a may be associated with the one charging resistor 10a, and the other charging resistor 10b can be bridged by a bypass line, in which a switch 11 is located.

The described linking of the two energy stores 2 and 3 to the voltage intermediate circuit ensures with little circuit hardware complexity that the electrical energy store 2 is always used first of all, as a result of which the electrochemical energy store 3 is loaded to a lesser extent, thus leading to a longer life.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. An electrical drive system of a vehicle, comprising:
an electrical energy store; and
an electrochemical energy store, connected in parallel to the electrical energy store;
device with a forward direction away from the electrochemical energy store is arranged in a connecting line between the electrical energy store and the electrochemical energy store, in order to prevent the electrochemical energy store from being charged from the electrical energy store and
an inductor is arranged in the line circuit of the electrical energy store and the electrochemical energy store, in order to form at least one of a step-up and a step-down converter, wherein
the vehicle is a rail vehicle,
the electrical energy store and the electrochemical energy store are connected to a voltage intermediate circuit of a converter,
the electrochemical energy store is connected to a charging device for supplying electrical energy via an overhead line or a live rail, and
at least two components, which can be switched off, are connected to form the converter, one of the at least components being connected to the energy electrical energy store and the electrochemical energy store while another of the at least two components is connected to the charging device.

2. The electrical drive system as claimed in claim 1, wherein the device is a mechanical switch, an electronic switch or a diode.

3. The electrical drive system as claimed in claim 2, wherein a maximum voltage across the electrochemical energy store is between 40% and 70% of the maximum voltage across the electrical energy store.

4. The electrical drive system as claimed in claim 1, wherein a maximum voltage across the electrochemical energy store is between 40% and 70% of the maximum voltage across the electrical energy store.

5. The electrical drive system as claimed in claim 1, wherein the at least one component is connected to the energy electrical energy store and the electrochemical energy store in parallel.

6. The electrical drive system as claimed in claim 1, wherein the at least two components are connected in series.

* * * * *